United States Patent [19]
Raff et al.

[11] 3,763,018
[45] Oct. 2, 1973

[54] PREVENTION OF FOULING IN HYDROCARBON SEPARATION

[75] Inventors: Paul Raff, Ludwigshafen; Gerhard Ritzert, Dannstadt; Hans-Martin Weitz, Frankenthal, all of Germany

[73] Assignee: Badische Anilin- & Soda-Fabrik Aktiengesellschaft, Ludwigshafen/Rhein, Germany

[22] Filed: Mar. 23, 1972

[21] Appl. No.: 237,546

[30] Foreign Application Priority Data
Apr. 1, 1971 Germany................. P 21 15 858.7

[52] U.S. Cl.............. 203/9, 208/48 AA, 260/666.5
[51] Int. Cl........................... C07c 7/18, C07c 69/52
[58] Field of Search.............................. 208/48 AA; 260/666.5; 203/9, 8

[56] References Cited
UNITED STATES PATENTS 3,426,063  2/1969  Gros et al. ...................... 260/666.5
3,523,141  8/1970  Sakashita........................ 260/666.5
3,551,507  12/1970 Sakuragi et al................. 260/666.5

*Primary Examiner*—Delbert E. Gantz
*Assistant Examiner*—G. E. Schmitkons
*Attorney*—Johnston, Root et al.

[57] ABSTRACT

A process for avoiding fouling in separating hydrocarbon mixtures containing unsaturated hydrocarbons at elevated temperatures using selective solvents in the presence of antifouling agents wherein a N-substituted N-nitrosohydroxylamine of the general formula

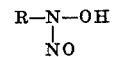

in which R is an aliphatic, cycloaliphatic or araliphatic hydrocarbon radical (which may bear inert radicals as substituents) and/or a salt thereof is used as an anti-fouling agent.

5 Claims, No Drawings

PREVENTION OF FOULING IN HYDROCARBON SEPARATION

This invention relates to a process for avoiding fouling in separating hydrocarbon mixtures containing unsaturated hydrocarbons at elevated temperatures using selective solvents in the presence of antifouling agents wherein a N-substituted N-nitrosohydroxylamine of the general formula $$R-N(NO)-OH$$

in which R is an aliphatic, cycloaliphatic or araliphatic hydrocarbon radical (which may bear inert radicals as substituents) and/or a salt thereof is used as an antifouling agent.

Hydrocarbons mixtures which contain unsaturated compounds are important feedstocks for the recovery of valuable petrochemical precursors such as acetylene, butenes, butadiene, isoprene, cyclopentadiene and aromatics. For the industrial scale recovery of these precursors it is mainly hydrocarbon mixtures obtained in pyrolysis methods, dehydrogenation methods and in the incomplete combustion of hydrocarbons with oxygen that are currently used. The said precursors are recovered from the said hydrocarbon mixtures by the use of special separation methods, for example by means of solvent absorption, countercurrent gas scrubbing, extractive distillation, liquid-liquid extraction or a combination of these methods using selective solvents. Fouling (i.e., deposition of high molecular weight compounds which are sparingly soluble in the solvents used) in the apparatus used in the said separation methods, such as columns, heat exchangers and pumps, causes difficulties because the deposits may result in stoppages. It is therefore impossible to carry out the separation process continuously over long periods. Since the hydrogenation mixtures used for the separation contain not only the main products but also a variety of different olefinically and/or acetylenically unsaturated compounds, it has not hitherto been possible, in spite of many investigations, to obtain a clear picture as to the nature of the deposits. Thus for example polymerization inhibitors such as t-butylpyrocatechol, which are conventionally used for preventing polymerization of monomers such as butadiene or styrene, are without any effect in the prevention of fouling. Conversely it is also true that for example sodium nitrite, which has a fairly good effect in the prevention of fouling, is completely unsuitable as an inhibitor for the storage of monomers such as butadiene. Compounds such as N-diethylhydroxylamine and salts of N-nitrosophenylhydroxylamine (which are very effective inhibitors for preventing popcorn polymerization) exert no action at all, or only an extremely slight action, in the prevention of fouling. It is evident that not only polymerization processes but also oxidation processes play an important part. Without uneconomic expenditure for apparatus it is impossible in most cases to avoid a small amount of oxygen entering an industrial plant, even when such plant is operated at superatmospheric pressure. Elementary analysis of the deposits which occur in carrying out one of the abovementioned separation methods in the absence of a fouling inhibitor shows that these deposits contain surprisingly large amounts, for example up to 5 percent by weight, of oxygen.

The object of the invention is to provide a process for avoiding fouling in the separation of hydrocarbon mixtures containing unsaturated hydrocarbons at elevated temperature wherein the continuous separation can be carried out for prolonged periods of time without interruption.

In accordance with this invention this and other objects and advantages are achieved in a process for avoiding fouling in the separation of hydrocarbon mixtures containing unsaturated hydrocarbons at elevated temperatures using a selective solvent in the presence of an antifouling agent, in which an N-substituted N-nitrosohydroxylamine of the general formula:

$$R-N(NO)-OH$$

in which R is an aliphatic, cycloaliphatic or araliphatic radical (which may bear an inert radical as substituent) and/or a salt thereof is used as the antifouling agent.

In the N-substituted N-nitrosohydroxylamines of the general formula $$R-N(NO)-OH$$

R is an aliphatic, cycloaliphatic or araliphatic hydrocarbon radical which may bear an inert radical as a substituent and which generally contains up to 20 and preferably up to 10 carbon atoms. The said groups may moreover contain inert radicals such as halogen, hydroxy, lower alkoxy, aroxy, carbonyl, carboxyl, amino, lower alkylamino, sulfo, nitro or cyano groups. Examples of suitable radical R are: methyl, β-methoxyethyl, β-phenoxyethyl, β-dimethylaminoethyl, isopropyl, butyl, octyl, decyl, stearyl, cyclohexyl, cyclooctyl, cyclododecyl, methylolcyclohexyl, cyanocyclohexyl and benzyl.

The N-substituted N-nitrosohydroxylamines may be used as such and/or in the form of their salts as inhibitors. The transition metals, the metals of group 3a of the Periodic Table, the alkaline earth metals and particularly the alkali metals and the lanthanoid series are preferably used as cations. (The transitions metals and the metals of group 3a are those given in Handbook of Chemistry and Physics, 49th edition (1968–1969)). Examples of suitable metals are sodium, potassium, magnesium, calcium, aluminum, lead, silver, copper, zinc, mercury, cerium iron, nickel and cobalt. The ammonium cation and ammonium cations bearing organic radicals such as lower alkyl or cycloalkyl groups, for example, cyclohexyl groups, as substituents are also suitable as cations. Metals having complex ligands, for example $(Cu(NH_3)_4)^{(+x+)}$ are also suitable. For practical reasons, ammonium salts of N-substituted N-nitrosohydroxylamines with or without organic radicals as substituents are preferred because in the regeneration by distillation of the solvent used in the separation processes described above a residue is obtained which can be burnt without difficulty. Alkali metal salts may also be used with advantage because of their ready accessibility.

The production of the inhibitors to be used according to the invention is known. For example they may be prepared by reduction of the corresponding nitro compounds of the general formula $RNO_2$ in which R has the meanings given above to the hydroxylamines followed by nitrosation of the hydrolylamines obtained.

Since the salt of the N-substituted N-nitrosohydroxylamines are as a rule more stable than the corresponding free compounds, it is advantageous to use the salts of these compounds as anti-fouling agents.

Examples of processes for separating hydrocarbon mixtures containing unsaturated hydrocarbons in which the antifouling agents may be used advantageously include the recovery of acetylene from hydrocarbon mixtures which have been obtained by incomplete combustion of hydrocarbons with oxygen, the recovery of butadiene from $C_4$ hydrocarbon mixtures, the recovery of isoprene and/or cyclopentadiene from $C_5$ hydrocarbon mixtures, the recovery of aromatics from hydrocarbon mixtures, and the recovery of butenes from $C_4$ hydrocarbon mixtures, in each case using selective solvents. The antifouling agents may be used with special advantage in the recovery of isoprene and cyclopentadine from $C_5$ hydrocarbon mixtures and particularly the recovery of butadiene from $C_4$ hydrocarbon mixtures by means of a selective solvent.

It is advantageous to use the antifouling agents in processes for separating hydrocarbon mixtures containing unsaturated hydrocarbons in which elevated temperatures, for example temperatures of from 50° to 180° C or even higher temperatures are necessary. Examples of suitable selective solvents for the separation of hydrocarbons are dimethylformamide, dimethylacetamide, furfurol, acetonitrile and particularly N-alkylpyrrolidones such as N-methylpyrrolidone. It may be advantageous to add a small amount of water, for example 5 to 15 percent, preferably to to 10 percent, by weight of water to the selective solvent to increase selectivity.

The N-substituted N-nitrosohydroxylamines and/or their salts are used in conventional ways, for example by adding them to the mixtures of hydrocarbons and/or to the solvent. The antifouling agent may be added in substance or in the form of a solution and in this case — depending on the point at which it is added — the hydrocarbon to be separated, the selective solvent used in the separation process or water may be used as solvent. Naturally the anti-fouling agent to be used according to the invention may also be added as a solution in another solvent or solvent mixture which may contain water. The concentration of the antifouling agent with reference to the amount of selective solvent is as a rule very small and is generally from 1 ppm (by weight) to 10 percent by weight, preferably from 1 ppm by weight to 0.1 percent by weight, particularly from 10 to 100 ppm by weight. Higher concentrations of the antifouling agent may be added but generally no advantage is obtained thereby.

In order to maintain a specific concentration of the anti-fouling agent in the selective solvent it may be advantageous to use N-substituted N-nitrosohydroxylamines and/or their salts which have only a fairly low solubility in the selective solvent which is approximately equivalent to the desired concentration of the anti-fouling agent in the selective solvent in question. If a certain amount of this antifouling agent having limited solubility is installed in a suitable way, for example in a filter basket, as a reserve in the selective solvent cycle of the separation process, the desired concentration of antifouling agent can be kept constant for a long period of time.

The N-substituted N-nitrosohydroxylamines and/or their salts are very effective antifouling agents in the separation of hydrocarbon mixtures containing unsaturated hydrocarbons by means of selective solvents and a combination or mixture of two or more of these antifouling agents may be used. It may be advantageous however to use one or more of these antifouling agents in combination with a conventional inhibitor such as a monophenol or polyphenol, for example tert.-butylpyrocatechol or hydroquinone, a mercaptan, phenothiazine, an aromatic amine such as $\beta$-naphthylamine, an ester of phosphorous acid, methylene blue, an aliphatic or aromatic aldehyde or sodium nitrite.

It may also be advantageous to add to the selective solvent substances with which a specific pH, preferably of from 7.5 to 9, can be maintained, such a buffer substances, for example salts of phosphoric acid, lower aliphatic carboxylic acids, for example acetic acid, or alkali metal hydroxides or alkali metal carbonates, for example sodium hydroxide or sodium carbonate.

The following Examples illustrate the invention.

TABLE 1

| Concentration in inhibitor in ppm by weight in NMP | Effect |
|---|---|
| 1. None | Very marked polymerization |
| 2. 1000 cerium(III) salt of N-nitrosocyclohexyl-hydroxylamine | no polymerization |
| 3. 500 - ditto - | A little polymer (as with 500 ppm of $NaNO_2$) |
| 4. 100 - ditto - | Polymers (like 500 ppm $NaNO_2$) |
| 5. 1000 calcium salt of N-nitrosocyclohexyl-hydroxylamine | Very little polymer |
| 6. 500 - ditto - | A little polymer (like 1000 ppm of $NaNO_2$ |
| 7. 1000 potassium salt of N-nitrosocyclohexyl-hydroxylamine | little polymer (less than with 1000 ppm of $NaNO_3$) |
| 8. 500 ammonium salt of N-nitrosocyclohexyl-hydroxylamine | little polymer (like 1000 ppm $NaNO_2$) |
| 9. 1000 aluminum salt of N-nitrosocyclohexyl-hydroxylamine | little polymer (somewhat better than 10) |
| 10. 1000 $NaNO_2$ | little polymer (more than 7, like 3) |
| 11. 500 $NaNO_2$ | polymers |
| 12. 1000 N-nitrosophenyl-hydroxylamine | strong polymerization |
| 13. 500 - ditto - | very strong polymerization |
| 14. 500 p-nitrobenzoic acid | more polymers than with 500 ppm $NaNO_2$ |
| 15. 500 nitrobenzene | more polymers than with 500 ppm $NaNO_2$ |
| 16. 500 nitrophenol | more polymers than with 500 ppm $NaNO_2$ |
| 17. 500 nitroaniline | more polymers than with 500 ppm $NaNO_2$ |
| 18. 500+ mixture of o-nitrophenol and $NaNO_2$ | worse than with 1000 ppm of $NaNO_2$ |
| 19. 1000 tert-butylpyrocatechol | very strong polymerization |
| 20. 1000 N,N-diethylhydroxylamine | little polymer, like 500 ppm $NaNO_2$ |
| 21. 1000 sodium salt of N-nitroso-N-cyclododecylhydroxylamine | little polymer (like 7) |
| 22. 1000 sodium salt of N-nitroso-N-cyclododecyl-hydroxylamine | little polymer like 1000 ppm $NaNO_2$ |
| 23. 1000 sodium salt of N-nitroso-N-cyclooctyl-hydroxylamine | little polymer |

It is evident from this Table that the antifouling agents to be used according to this invention are better inhibitors in N-methylpyrrolidone at elevated temperature than sodium nitrite which in turn has superior stabilizing action to organic nitro compounds and other known polymerization inhibitors (cf. Comparative Experiments 10 to 20).

EXAMPLE 2

N-methylpyrrolidone containing 500 ppm by weight of peroxide (calculated as $H_2O_2$) and the inhibitors set out in the following Table 2 are placed in an autoclave. Such an amount of butadiene is added that a pressure of 15 atmospheres is set up in the autoclave at 140° C. Twenty hours later the amount of polymers obtained is compared with the amount of polymers obtained when 1,000 ppm by weight of sodium nitrite in NMP free from peroxide is used as inhibitor for the same period under the same experimental conditions.

TABLE 2 a. NMP with 500 ppm by weight of peroxide

| Concentration in ppm by weight of inhibitor in NMP | Effect |
|---|---|
| 1. 1000 cerium(III) salt of N-nitrosocyclohexylhydroxylamine | little polymer |
| 2. 1000 calcium salt of N-nitrosocyclohexyl hydroxylamine | little polymer |
| 3. 1500 - ditto - | very little polymer |
| 4. 1000 potassium salt of N-nitrosocyclohexylhydroxylamine | little polymer |
| 5. none | very strong polymerization | b. NMP without peroxides

| | |
|---|---|
| 6. 1000 sodium nitrite | little polymer (more than in 1, 2 and 4) |

It is evident from Table 2 that the salts of N-nitrosocyclohexylhydroxylamine, even in NMP containing peroxide, are better antifouling agents than sodium nitrite in NMP devoid of peroxide.

EXAMPLE 3

N-methylpyrrolidone (NMP) and the inhibitors specified in the following Table 3 are placed in a carefully cleaned autoclave while excluding air. Then such an amount of isoprene is added that a pressure of five atmospheres gauge is set up at 140° C. Twenty hours later, the amounts of polymers formed are compared with one another. The following results are obtained:

TABLE 3

| Concentration in % by weight of inhibitor in NMP | Effect |
|---|---|
| 1. none | very strong polymerization |
| 2. 1000 cerium(III)salt of N-nitrosocyclohexylhydroxylamine | little polymer |
| 3. 1000 calcium salt of N-nitrosocyclohexylhydroxylamine | little polymer, somewhat more than in 2 |
| 4. 1000 potassium salt of N-nitrosocyclohexylhydroxylamine | little polymer, somewhat more than in 2 |
| 5. 1000 ammonium salt of N-nitrosocyclohexylhydroxylamine | little polymer |
| 6. 1000 sodium nitrite | polymers (more than in 2, 3, 4 and 5) |

EXAMPLE 4

Dimethylformamide (DMF) and the inibitors specified in the following Table 4 are placed in a carefully cleaned autoclave while excluding air.

Then such an amount of butadiene is added that at 140° C a pressure of 15 atmospheres is set up in the autoclave. Twenty hours later the amounts of polymers are compared with one another. The following results are obtained:

TABLE 4

| Concentration in % by weight of inhibitor in DMF | Effect |
|---|---|
| 1. none | very strong polymerization |
| 2. 1000 cerium salt of N-nitrosocyclohexylhydroxylamine | no polymerization |
| 3. 1000 calcium salt of N-nitrosocyclohexylhydroxylamine | very little polymer |
| 4. 500 ammonium salt of N-nitrosocyclohexylhydroxylamine | little polymer |
| 5. 1000 sodium nitrite | little polymer (more than in 4) |

The usefulness of the results from the rapid test described in the foregoing Examples is tested by comparing the results in the measurement of fouling factors in a test plant for separating $C_4$ cracked cuts with extractive distillation using N-methylpyrrolidone as selective solvent. An evaluation of the antifouling effect of the inhibitors used in the Examples when used in industrial separating plant is possible by comparison with the effect of sodium nitrite for which exact measurements of fouling factors are available. The fouling factor has about the value $1 \times 10^{-4}$ per month for example when using NMP as selective solvent and a sodium nitrite concentration of 100 ppm.

We claim:

1. A process for the prevention of fouling in the separation of hydrocarbon mixtures containing unsaturated hydrocarbons at elevated temperature using a selective solvent in the presence of an antifouling agent wherein a N-substituted N-nitrosohydroxylamine of the general formula:

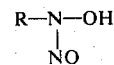

in which R is an aliphatic, cycloaliphatic or araliphatic hydrocarbon radical which may bear inert radicals as substituents and/or a salt of the same is used as the antifouling agent.

2. A process as claimed in claim 1 wherein the hydrocarbon mixture used is a $C_4$ and/or $C_5$ hydrocarbon mixture.

3. A process as claimed in claim 1 wherein an N-alkylpyrrolidone is used as the selective solvent.

4. A process as claimed in claim 1 wherein acetonitrile, dimethylformamide, furfurol or dimethylacetamide is used as the selective solvent.

5. A process as claimed in claim 1 wherein the antifouling agent is a N-nitroso-N-cyclohexyl hydroxylamine or an alkali metal, ammonium or substituted ammonium salt thereof.

* * * * *